United States Patent [19]

Kuhn et al.

[11] Patent Number: 4,512,414
[45] Date of Patent: Apr. 23, 1985

[54] ROTARY TILLER

[75] Inventors: John B. Kuhn, Mayville; Henry J. Lange, Juneau, both of Wis.

[73] Assignee: Deere & Company, Moline, Ill.

[21] Appl. No.: 570,721

[22] Filed: Jan. 13, 1984

[51] Int. Cl.³ .................... A01B 33/08; B60R 27/00
[52] U.S. Cl. .................... 172/112; 172/125; 280/5 R
[58] Field of Search ........... 280/5 R, 5 F; 172/112, 172/125, 47; 180/308

[56] References Cited

U.S. PATENT DOCUMENTS

| | | | |
|---|---|---|---|
| 3,183,980 | 5/1965 | Howard | 172/47 |
| 3,577,664 | 5/1971 | Sing | 280/5 R |
| 4,322,086 | 3/1982 | Bennink | 280/5 R |

FOREIGN PATENT DOCUMENTS

| | | | |
|---|---|---|---|
| 65834 | 8/1975 | Australia | 172/125 |
| 2035805 | 1/1972 | Fed. Rep. of Germany | 280/5 F |

Primary Examiner—Richard J. Johnson

[57] ABSTRACT

A rotary tiller having a housing defining a hydraulic fluid reservoir and rotatably support a tine shaft. A hydraulic motor is mounted to the housing in driving communication with the tine shaft. A pump unit is remotely located on an associated tractor. The reservoir received spent hydraulic fluid from the motor, cools the fluid, and surrenders the cooled fluid to the pump unit.

4 Claims, 4 Drawing Figures

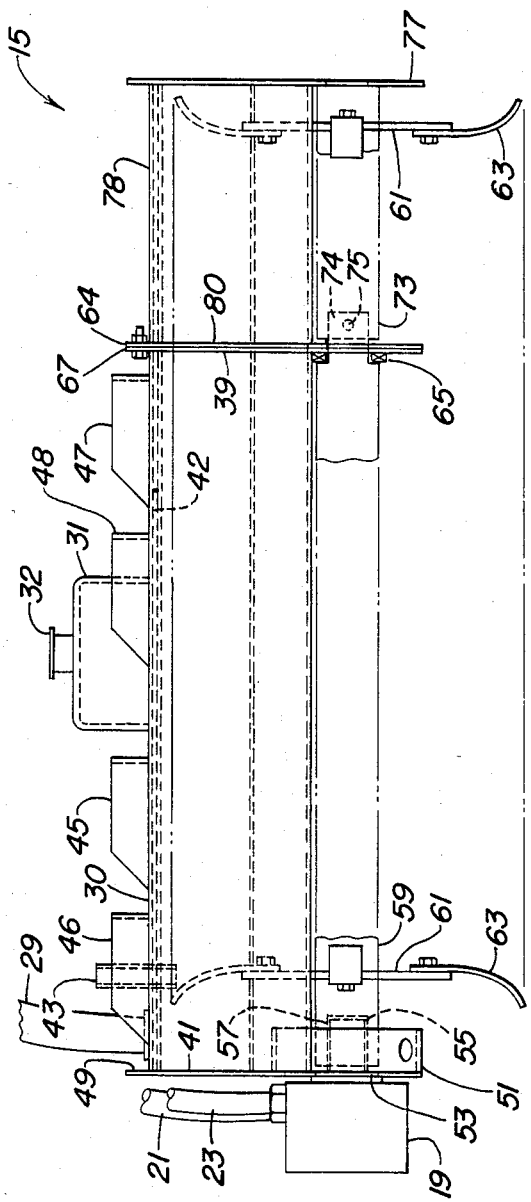
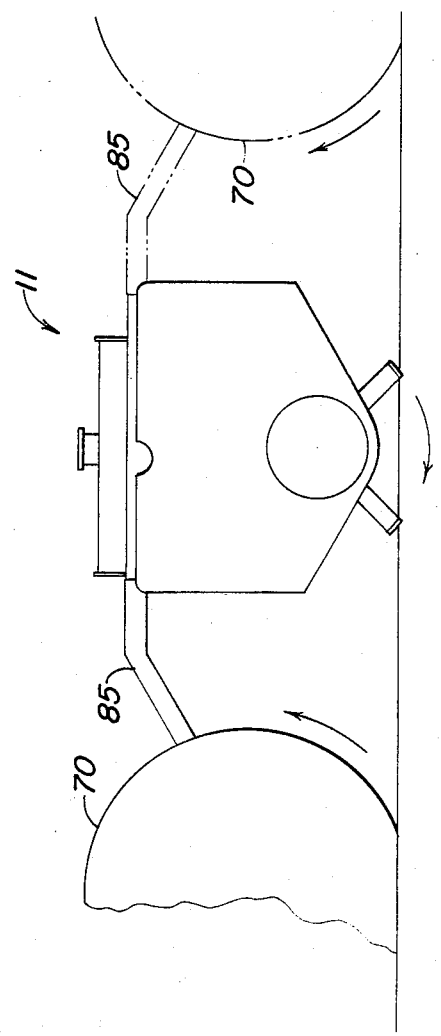
FIG. 3
FIG. 4

ROTARY TILLER

BACKGROUND OF THE INVENTION

This invention relates to rotary tiller used for soil conditioning.

A conventional rotary tiller includes a housing with an open bottom rotatably containing a tine shaft carrying a plurality of tine teeth. The tiller is attached to a tractor and is powered by the tractor's power take-off system (PTO) which drives a shaft or chain arrangement associated with the rotary tiller. It is also known to use a PTO driven hydraulic pump and motor arrangement to drive the tine shaft. Hydraulic motors are quieter than other drive systems and avoids alignment problems associated with shaft and chain arrangements. However, it is customary to utilize the tractor hydraulic system to derive hydraulic fluid for the pump and motor which can introduce contaminates to the pump and motor units.

Another problem encountered is predicted upon the soil conditions. In hard soil condition, the tine shaft ground engagement characteristics can cause the rear wheel of the tractor to loose traction. And, because the rotational speed of the tine shaft is much greater than the tractor speed, the tractor can be propelled forward causing a loss of operator control.

SUMMARY OF THE INVENTION

It is an object of this invention to disclose a tiller with easier manufacturing properties through the elimination of any sprocket wheels, chains or gear drive systems. It is a further objective of the present invention to present a tiller which is driveable in either a counter tiller to tractor wheel rotation or a corresponding tiller to tractor rotation direction.

It is a still further objective of the present invention to present a tiller utilizing a hydraulic motor drive system. It is another still further objective of the present invention to present a tiller which utilizes the tiller housing for a reservoir and cooling component of a segregated hydraulic power transmission system associated with the tiller.

The tiller housing is constructed utilizing a cross-sectional arched underside in combination with the housing walls to provide an elongated chamber which can be supplied with hydraulic fluid to serve as a reservoir. Fixably mounted to the housing is a hydraulic motor drivingly supporting one end of the tine shaft which is rotatably supported in the opposite wall of the tiller housing. Remotely located on an accompanying tractor is a pump unit in line communication with the input of the motor. The output of the motor feeds through a filter back into the reservoir formed by the housing walls, which supplies hydraulic fluid to the pump unit. The reservoir is fashioned to require warm hydraulic fluid discharged from the motor unit to travel the length of the housing and over the arch underside before being received in the suction line leading the pump unit. The hydraulic fluid is cooled as it travels through the housing. The subsequent detailed description of the present invention will present additional benefits of the invention.

BRIEF DESCRIPTION OF THE DRAWINGS

FIG. 3 is an elevated front view of the tiller housing.

FIG. 4 is a schematic side view of the tiller mounted to an associated tractor.

DESCRIPTION OF THE PREFERRED EMBODIMENT

Figure 1:
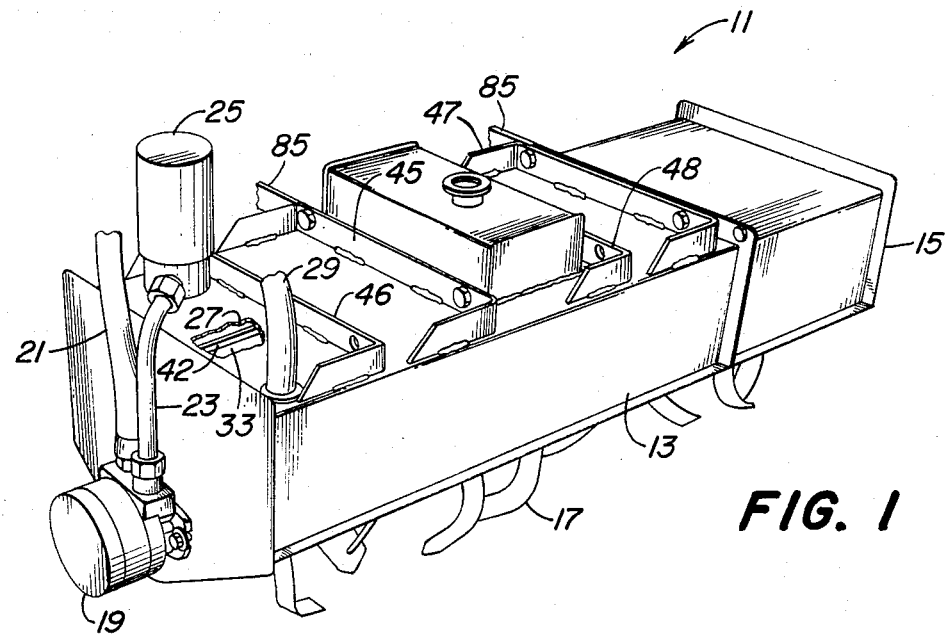
FIG. 1 is a perspective view of a tiller in accordance with the present invention.

Referring to FIG. 1, a tiller generally indicated as 11 is comprised of a main housing 13 and an extention housing 15. Tine shafts carry a plurality of tine teeth 17 and are rotatably supported in the housings 13 and 15. The tine shafts are driven by hydraulic motor 19 fixably mounted to the tiller housing 13. An input line 21 is received by the hydraulic motor delivering pressurized hydraulic fluid from a remotely located hydraulic pump (not shown). A return line 23 receives spent fluid from the hydraulic motor 19 and delivers it to a filter 25 which thereafter delivers the fluid to a reservoir chamber 27 formed by the housing 13. A suction line 29 receives cold hydraulic fluid and delivers the hydraulic fluid to the input of the remotely located pump.

Figure 2:
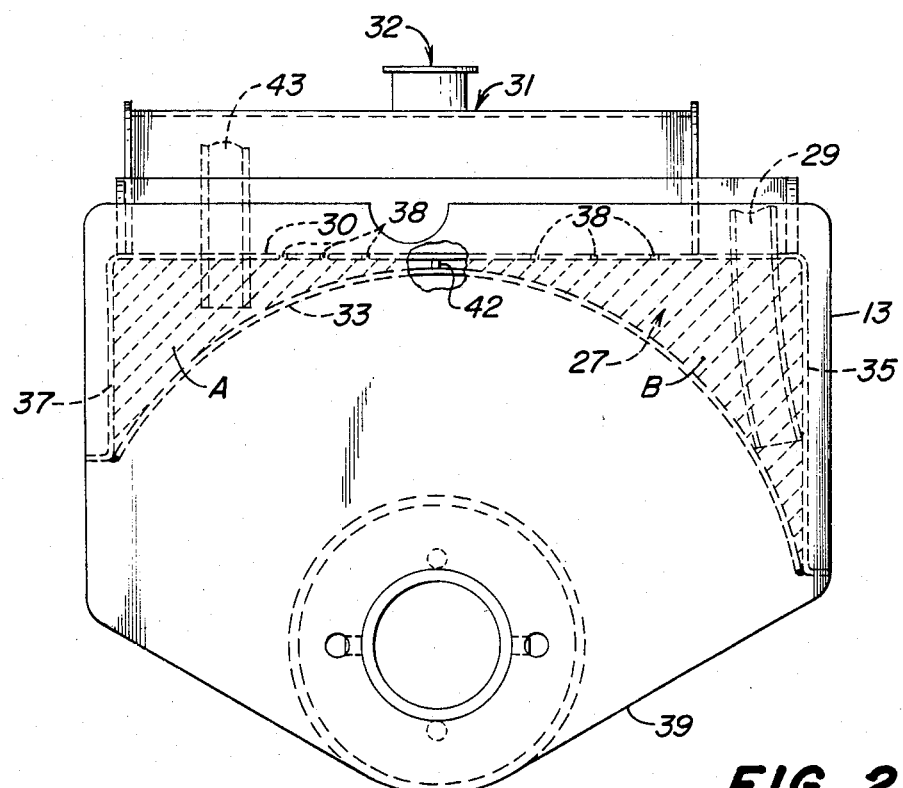
FIG. 2 is an elevated side view of the tiller.

Referring more particularly to FIGS. 2 and 3, the housing 13 is comprised of top wall 30 having fixably mounted atop wall 30 an expansion chamber 31 including filler cap 32. The reservoir 27 is formed in combination with the top wall 30, forward wall 35 and rear wall 37, and end walls 39 and 41 respectively. A bottom wall 33 is fixably mounted to the walls 35, 37, 39 and 41 by any conventional means and has a generally arched cross-sectional configuration. A baffle plate 42 extending longitudinally is fixably mounted by any conventional means particularly along the apex of the bottom wall 33 and to the underside of top wall 30, and also, to end wall 41 separating the reservoir into sections A and B. One end of baffle plate 42 is in spaced apart relationship to end wall 39. The housing top wall 30 forms the underside of the expansion chamber 31 and has a plurality of apertures 38 extending through wall 30 to each side of baffel 42 to allow communication between reservoir 27 and expansion chamber 31. A filter line 43 to which filter 25 is fixably mounted to by any conventional means extends through the top wall 30 into section A of the reservoir on one side of baffle plate 42. The suction line 29 extends through the top wall 30 substantially into section B of the reservoir 27 on the other side of baffle plate 42.

Fixably mounted transversely across the top wall 30 of the housing 13 in spaced apart opposite relationship are mounting members 45, 46, 47 and 48.

Hydraulic motor 19 is fixably mounted in sidewall 41 within a formed mounting sleeve 51 by any conventional means such as by bolts. The motor output shaft 55 extends into the housing 11 and is splined within the tine shaft 59 at 57. The tine shaft 59 is of conventional design carrying a plurality of tine blade 61 in spaced apart relationship, each tine blade 61 having a plurality of tine teeth 63 fixably mounted thereto in spaced apart relationship. A conventional bearing set 65 is mounted into the lower portion of housing wall 39 and rotatably supports the other end of tine shaft 59. The housing wall 39 contains a flange 67 extending transversely along the end of top surface 30.

The extention 15 comprised of housing extension 78. One other end of the extension tine shaft 73 contains a portion 74 which receives a portion of tine shaft 59 extending through end wall 39 and extention end wall 80 and is pinned to shaft 59 at 75. The two housings are joined along respective walls 39 and 80 by fixably mounting respective wall flanges 67 and 69 by any conventional means such as by bolts.

Referring now to FIG. 4, it is observed that a tractor can be mounted to either side of the tiller 11 such that the tractor rear wheel 70 can rotate either in the same direction as the tine shaft, or as shown in phantom in the opposite direction of the tine shaft. Further, the tiller 11 can be centered relative to the tractor by securing hitch arms 85 to mounting members 46 and 48, or mounting members 45 and 47 when the tiller extension 15 is also be used.

It is further observed that the tiller offers the further advantage of having a segregated hydraulic system which reduces contaminant problems. Also, the tiller housing offers good cooling properties which eliminates the necessity to have a separate hydraulic fluid cooling system by providing the reservoir as part of the tiller housing and requiring the fluid to flow longitudinally in section A, over the apex of under surface 33, between baffel 42 and end wall 39, and longitudinally in section B before being received in line 29.

We claim:

1. An improved tractor mounted rotary tiller having a housing formed by a first and second end wall, a plurality of elongated sidewalls sealably and fixably mounted at their respective ends to a respect one of said end walls, a tine shaft rotably mounted in said end walls, a top wall sealably and fixably mounted to said end and sidewalls, hydraulic drive means operatively and cooperatively mounted to said tractor and said tiller housing for driving said tine shafts wherein the improvement comprises, said tiller housing further having a bottom wall fixably mounted to said end and sidewalls beneath said top wall, whereby said walls define a fluid reservoir, an inlet tube extending through said top wall into said reservoir; a suction tube extending through said wall substantially submerged into said reservoir; means for conducting fluid to said inlet tube from said hydraulic drive means, and for conducting fluid from said suction tube to said hydraulic drive means.

2. A rotary tiller as claimed in claim 1 wherein said bottom wall has a generally arched transverse cross-sectional configuration, said inlet tube being located to one side of said bottom wall's apex, and said suction tube being located to another side of said bottom wall's apex.

3. A rotary tiller as claimed in claim 2, further comprising a baffel plate fixably mounted to and partially along said apex of said bottom wall, said top wall and one of said end walls, and in spaced apart relationship to another of said end walls.

4. A rotary tiller as claimed in claim 1 and 3 further including an expansion chamber fixably mounted to said top wall, and a plurality of apertures through said top wall into said expansion chamber.

* * * * *